Jan. 23, 1945. H. S. JONES 2,367,868
MEASURING APPARATUS
Filed May 27, 1942
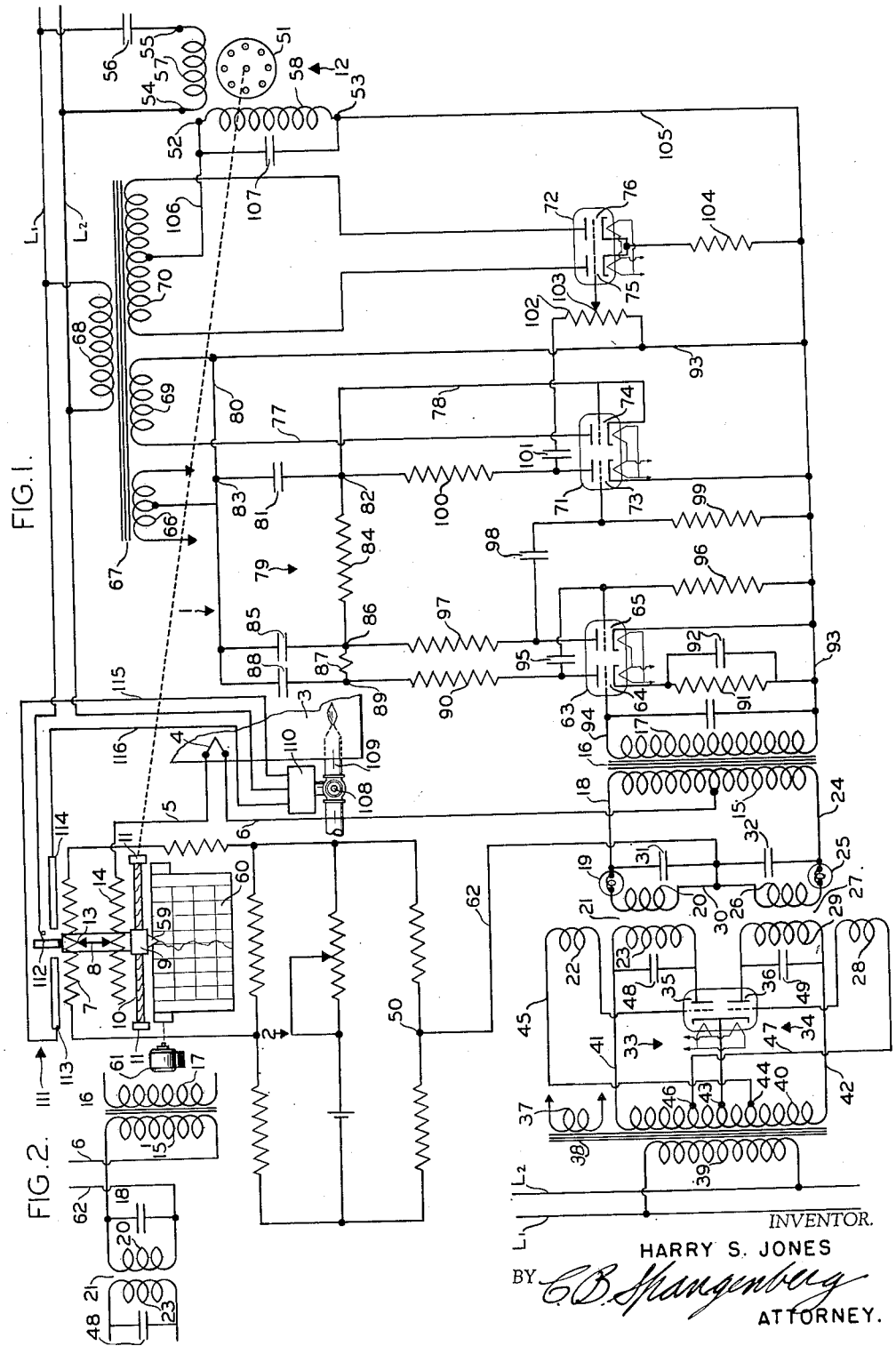
INVENTOR.
HARRY S. JONES
BY C.B. Spangenberg
ATTORNEY.

Patented Jan. 23, 1945

2,367,868

UNITED STATES PATENT OFFICE 2,367,868

MEASURING APPARATUS

Harry S. Jones, Arlington, Va., assignor to The Brown Instrument Company, Philadelphia, Pa., a corporation of Pennsylvania Application May 27, 1942, Serial No. 444,747

13 Claims. (Cl. 171—95)

The present invention relates to improved apparatus for measuring and/or utilizing for control and analogous purposes minute direct currents such as those resulting from the voltage variations of thermocouples or photovoltaic cells.

An object of the invention is to provide novel and effective means for converting a minute direct current into an alternating current which may be readily amplified for measurement, control and other purposes.

Another object of the invention is to provide an improved arrangement for producing alternating current from a direct current source of electromotive force which is characterized by the simplicity and effectiveness of the apparatus required, and particularly by the fact that it does not include, nor require, any physically movable parts.

A further object of the invention is to effect a novel and desirable combination of means for converting direct current into alternating current with potentiometric measuring apparatus to thereby produce a novel and relatively simple form of self balancing potentiometer instrument which may follow the approved practices of the art in respect to many of its features.

In one embodiment of the invention I utilize the source of small direct current electromotive force under measurement to create a pulsating current of regular frequency by connecting the current source in circuit with a resistive device having an appreciable temperature coefficient of resistance, and therefore, varying in resistance in accordance with the temperature thereof and heating the resistance with suitable regularity and frequency by means advantageously consisting of a high frequency oscillator from which high frequency alternating current modulated at the desired frequency, for example 60 cycles, is impressed on the resistance. The flow of this modulated high frequency current through the resistive device produces variations in the conductivity of the latter at the frequency at which the high frequency current is modulated, and consequently, causes pulsations in the current flow in the circuit which connects the direct current source to the resistive device. The pulsating current thus created is translated by suitable inductive resistance or other apparatus, such as an ordinary transformer, into alternating current which may be amplified by the use of an electronic amplifier and utilized for the purpose of controlling the selective actuation of relatively rugged relays or a reversible electrical motor. A suitable filter is also provided for preventing the high frequency alternating current from being impressed on the input circuit of the amplifier and thus affecting the operation of the amplifier and the apparatus controlled thereby.

In a preferred embodiment of the invention I employ two temperature responsive resistances as the resistive device for converting the small direct current under measurement into an alternating current of regular frequency. In this embodiment a separate high frequency oscillator is provided for supplying modulated high frequency current to each of the resistances. Specifically, the resistances are connected in opposite branches of a bridge circuit on which the small direct current to be measured is impressed and the oscillators are so adjusted that pulses of high frequency energy are impressed across the resistances during alternate half cycles of the modulated frequency. That is to say, high frequency energy is supplied first to one resistance for increasing its magnitude during one half cycle of the modulating frequency; high frequency energy is supplied to the second resistance for increasing its magnitude. The pulsating direct currents which are created by the variations in value of the resistances are converted by a transformer the primary winding of which is connected in the bridge circuit and is center tapped whereby an alternating current of the same frequency as the modulating frequency but of one phase or of opposite phase depending upon the polarity of the impressed direct current will be derived in the secondary winding of the transformer.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawing:

Fig. 1 is a diagrammatic representation of a preferred embodiment of my invention; and Fig. 2 illustrates a modification of the arrangement of Fig. 1.

Referring to Fig. 1 of the drawing there is illustrated in schematic form an electronic device, generally indicated by the reference character 1, for producing effects in accordance with the extent of unbalance of a potentiometric measuring circuit 2 which controls the operation of the electronic device 1. The potentiometric circuit 2 is unbalanced in accordance with the variations in a quantity to be measured and because of the small magnitude of the unbalanced electromotive forces produced in the potentiometric circuit it is not practicable, nor desirable, to have the said effects produced directly by the potentiometric circuit.

More specifically, an arrangement is illustrated in the drawing for measuring and recording the temperature within a furnace 3 in the interior of which a thermocouple 4 is arranged so as to be responsive to slight changes in the temperature within the furnace. The thermocouple 4, which may be located at a distance from the remainder of the potentiometric measuring circuit, has its terminals connected by a pair of conductors 5 and 6 to the terminals of the potentiometric measuring circuit 2. The potentiometric measuring circuit 2 is preferably of the null point type and includes a slidewire resistance 7 and an associated contact 8 which is adapted to be moved along the length of the slidewire resistance 7. The potentiometric circuit 2, illustrated schematically in the drawing, may be of any suitable type such as the Brown potentiometric measuring circuit disclosed in Patent 2,150,502 issued to T. R. Harrison, E. H. Grauel and J. E. Kessler on March 14 1939.

The movable contact 8 is mechanically connected to a suitable carrier which, for example, may be in the form of an internally threaded nut 9 which is adapted to ride on a screw threaded rod 10 which is supported by suitable bearings 11 and is rotated in one direction or the other under control of the thermocouple 4. A reversible electrical motor generally designated by the reference character 12 is mechanically coupled in any convenient manner to the screw threaded rod 10 to rotate the latter at the desired speed and in the desired direction to thereby move the contact 8 along the slidewire resistance 7 to rebalance the potentiometric measuring circuit 2 whenever the latter is unbalanced in response to a change in electromotive force produced by the thermocouple 4.

The contact 8 is a bridging contact connecting the point 13 on the slidewire resistance 7 to a corresponding point on a slidewire resistance 14 which is arranged alongside the resistance 7. The resistance 14 has one end connected by the conductor 5 to one terminal of the thermocouple 4, and is employed for the purpose of avoiding measurement inaccuracies due to variations in resistance to the flow of current generated by the thermocouple 4 which would otherwise result from variations in the relative resistances of the portions of the resistance 7 at opposite sides of the point 13.

The other terminal of the thermocouple 4 is connected by means of the conductor 6 to the center tap on the primary winding 15 of an iron core transformer 16 having a secondary winding 17. One end terminal of the primary winding 15 is connected by a conductor 18 in which a lamp 19 is inserted to one terminal of the secondary winding 20 of an air core transformer 21 having primary windings 22 and 23. The other end of the transformer primary winding 15 is connected by a conductor 24 in which a lamp 25 is inserted to one end terminal of the secondary winding 26 of an air core transformer 27 having primary windings 28 and 29. The other ends of the air core transformer secondary windings 20 and 26 are connected together by a conductor 30 as shown, and the conductor 30 is connected to the other terminal of the potentiometer circuit 2. A condenser 31 is connected in shunt to the lamp 19 and secondary winding 20 and a condenser 32 is connected in shunt to the lamp 25 and secondary winding 26. The purpose of condensers 31 and 32 is explained hereinafter.

The unbalanced electromotive forces which are produced in the potentiometric network 2 upon variation in the electromotive force developed by the thermocouple 4 are impressed between the center tap on the transformer primary winding 15 and the conductor 30. The arrangement consisting of the lamps 19 and 25 and the transformer windings 15, 20 and 26 comprises a parallel circuit and is utilized for the purpose of converting the potentiometric unbalanced direct currents into pulsating currents which are translated by the transformer 16 into an alternating current of one phase or of opposite phase depending upon the polarity of the unbalanced direct currents derived from the potentiometer.

To this end the filaments of the lamps 19 and 25 are composed of a material having an appreciable temperature coefficient of resistance. When resistances of such material is employed, the relationship between the current flow through the the lamps 19 and 25 and the resistance of the filaments is non-linear. As the current through the lamps is increased the filament temperature is raised and because of the temperature coefficient of resistance possessed by the filament the resistance of the lamps is correspondingly increased. The lamps 19 and 25 may have nickel filaments which have a positive temperature coefficient of resistance, or if desired, lamps having a negative temperature coefficient of resistance such as carbon filament lamps may be utilized instead. Resistances of the type sold by Western Electric Co. under the trade name of Thermistors may be also employed if desired. Such resistances have a large negative temperature coefficient of resistance, and in addition have low heat capacity. The lamps 19 and 25 are preferably so constructed that the mass of the filaments is sufficiently small to permit rapid temperature and consequent resistance variations thereof, for example, of the order of 60 cycles per second.

This property of the lamps 19 and 25 is utilized in accordance with the present invention for the purpose of periodically increasing and decreasing the resistance of the circuit path through which the unbalanced potentiometric direct currents flow and thereby for creating a pulsating direct current flow through the transformer primary winding 15 which is converted by the transformer 16 into an alternating current of one phase or of opposite phase depending upon the direction of the direct current flow from the potentiometric circuit 2 through the transformer primary winding 15.

Such alternate increase and decrease in the resistance of the lamps 19 and 25 is effected by impressing on each lamp a high frequency alternating current modulated at a suitable frequency, for example, 60 cycles per second and derived from associated transformer secondary windings 20 and 26. As is explained hereinafter, the envelope of the modulated high frequency current derived from the transformer secondary winding 20 is preferably displaced 180° with respect to the modulated high frequency current derived from the transformer secondary winding 26. An electronic oscillator 33 is provided for inducing the modulated high frequency current in the transformer secondary winding 20 and an electronic oscillator 34 is provided for inducing the modulated high frequency current in the transformer secondary winding 26.

The oscillator 33 includes an electronic valve 35 having an anode, a control electrode, a cathode and a heater filament which is electrically connected in a suitable manner so as to normally oscillate at the desired high frequency. The oscillatory condition of the electronic valve 35 is promoted by an electrical interlinkage between the control electrode or input circuit and the anode or output circuit. As shown, this interlinkage is an inductive one and is obtained by means of the two inductively associated windings or coils 22 and 23 which are connected respectively in the input and output circuits of the valve 35.

The oscillator 34 includes an electronic valve 36 having an anode, a control electrode, a cathode and a heater filament and which also is connected so as to normally oscillate at the desired frequency. The oscillatory condition of the valve 36 is promoted by an electrical interlinkage between the transformer primary winding 28 which is connected in the input circuit of the valve 36 and the primary winding 29 which is connected in the output circuit of valve 26. The electronic valves 35 and 36, if desired may be contained within a single envelope as illustrated in the drawing. Energizing current is supplied the heater filaments of the electronic valves 35 and 36 from the secondary winding 37 of an iron core transformer 38 having a line voltage primary winding 39 and a high voltage secondary winding 40. The filaments of the electronic valves 35 and 36 are connected in parallel and the parallel connection is connected by conductors (not shown) to the terminals of the transformer secondary winding 37.

Energizing voltage is supplied to the output circuits of the electronic valves 35 and 36 from the transformer secondary winding 40. The output circuit of valve 35 may be traced from the upper terminal of the transformer winding 40 as seen in the drawing through a conductor 41, in which the transformer primary winding 23 is connected, to the anode of valve 35 and from the cathode thereof to a center tap 43 on the winding 40. The output circuit of the valve 36 may be traced from the lower terminal of the secondary winding 40 through a conductor 42 in which the transformer primary winding 29 is connected to the anode of valve 36 and from the cathode of the latter to the center tap on the winding 40.

The input circuit of the valve 35 may be traced from a point 44 on the transformer secondary winding 40, through a conductor 45 in which the winding 22 is inserted to the control electrode of the valve 35 and from the cathode of the valve 35 to the center tap 43. The point 44 on the transformer secondary winding is somewhat negative with respect to the potential of the center tap 43 during the half cycle of the alternating current supply when the upper terminal of the winding 40 is positive. The input circuit of the valve 36 may be traced from a point 46 on the winding 40, which is somewhat negative with respect to the potential of the center tap 43 during the half cycle when the lower terminal of the winding 40 is positive, to a conductor 47 in which the winding 28 is connected to the control electrode of valve 36.

By energizing the output circuits of the electronic valves 35 and 36 from the center tapped transformer secondary winding 40, high frequency energy is impressed on the lamp 19 during one half cycle of the alternating current supply which increases in magnitude while the high frequency energy impressed on the lamp 25 decreases in magnitude, and during the next half cycle of the alternating current supply high frequency energy is impressed on the lamp 25 which increases in magnitude while the high frequency energy impressed on the lamp 19 decreases in magnitude. That is to say, the envelope of the modulated high frequency current derived from the transformer secondary winding 20 is displaced approximately 180° with respect to the envelope of the modulated high frequency current derived from the transformer secondary winding 26. Thus, high frequency energizing currents are alternately impressed on the lamps 19 and 25 at the frequency of the alternating current supply source.

In accordance with the present invention the alternating current supply for the transformer primary winding 39 is preferably of commercial frequency, for example, 60 cycles and may be derived from alternating current supply lines $L^1$ and $L^2$. When 60 cycle alternating current is impressed on the transformer primary winding 39, high frequency energy modulated at 60 cycles per second is alternately impressed on the lamps 19 and 25. Condensers 48 and 49 are connected in parallel to the transformer primary winding 23 and 29 respectively for tuning the latter as required to produce the necessary feedback of energy to the input circuits of the electronic valves 35 and 36 to establish the desired high frequency oscillations. Condensers 31 and 32 previously referred to are used to by-pass high frequency current and thereby prevent it from passing through the primary winding 15 of the transformer 16 and through the thermocouple and measuring circuits. Therefore, substantially all of the high frequency energy must dissipate itself in the temperature responsive resistances or lamps 19 and 25.

Modulated high frequency current is particularly adapted for the purpose of producing variations in resistance of the lamps 19 and 25 at the desired frequency since no interference with the potentiometric measuring circuit or the alternating current supply source employed for operating the reversible electrical motor 12 results. The frequency of the high frequency source may be of the order of normal radio frequencies, if desired, or may be a comparatively high frequency such as 0.5 to 10 megacycles. The latter order of frequencies is preferable from the standpoint of simplicity and economy since the condensers 31, 32, 48 and 49 and the transformers 21 and 27 can then be very small and inexpensive.

With the arrangement described, the flow and direction of flow of current through the circuit from the point 50 of the potentiometric measuring circuit 2 through the variable lamp resistances 19 and 25, the transformer primary winding 15, and the bridging contact 8 to the point 13 of the potentiometric measuring circuit 2 depends upon the relation between the electromotive force produced by the thermocouple 4 and the potential difference between the potentiometric circuit points 13 and 50. The thermocouple 4 is so connected to the potentiometric measuring circuit that the electromotive force of the thermocouple opposes the potential difference between the points 13 and 50. The potential difference between the points 13 and 50 is increased and decreased by movement of the contact 8 to the right and to the left, respectively. With suitable adjustments of the contact 8, the potential difference between the points 13 and 50 will be equal and opposite to the electromotive force produced by the thermocouple 4 and no current will flow through the circuit branch including the lamps 19 and 25. On an increase in the thermocouple electromotive force above the potential difference between the points 13 and 50, current will flow in one direction through the circuit branch including the lamps 19 and 25 and through the transformer primary winding 15 and such current flow may then be eliminated by a suitable adjustment of the bridging contact 8 to the right. Conversely, when the electromotive force of the thermocouple 4 falls below the potential difference between the potentiometric circuit points 13 and 50, the resultant current flow through the lamps 19 and 25 and the transformer primary winding 15 will be in such a direction as to be eliminated by a suitable adjustment of the contact 8 to the left.

As is illustrated more or less diagrammatically in the drawing, the contact 8 is adjusted along the slidewire resistance 7 by the operation of the reversible electrical motor 12 which is shown as having its rotor 51 mechanically coupled to the threaded shaft 10. The reversible electrical motor 12 has a pair of terminals 52 and 53 which are connected to the output circuit of the electronic device 1, and also has a pair of terminals 54 and 55 which are connected through a condenser 56 of suitable value to the alternating current supply conductors L¹ and L².

For its intended use the motor 12 may be of the form schematically shown in the drawing and comprising a rotor 51 and two pairs of oppositely disposed field poles (not shown), on one pair of which a winding 57 is wound and on the other pair of which a winding 58 is wound. Winding 57 has its terminals connected to the motor terminals 54 and 55 and is supplied with energizing current from the alternating current supply conductors L¹ and L² through the condenser 56. Due to the action of the condenser 56 the current which flows through the motor winding 57 will lead the voltage of the alternating current supply lines L¹ and L² by approximately 90°.

The current supplied to the winding 58 of the motor 12 by the electronic device 1 is approximately in phase with or displaced 180° with respect to the voltage of the alternating current supply lines L¹ and L² and establishes a field in the rotor 51 which is displaced approximately 90° in one direction or the other with respect to that established therein by the winding 57. Reaction between the field set up by the winding 58 with that set up by the winding 57 establishes a rotating field in the rotor 51 which rotates in one direction or the other depending upon whether the winding 58 is energized with current in phase with the voltage of the alternating current supply lines L¹ and L² or displaced 180° in phase therewith, as is explained in detail hereinafter.

The direction and duration of rotation of the motor 12 is controlled in accordance with the direction and extent of unbalance of the potentiometric measuring circuit 2 so that upon rotation of the motor 12 the contact 8 is adjusted in the proper direction to rebalance the potentiometric measuring circuit 2. If desired, a pen 59 may be mounted on the carriage 9 which carries the contact 8 and may be arranged in cooperative relation with a recorder chart 60 to thereby provide a continuous record of the temperature to which the thermocouple 4 is subjected. The chart 60 may be a strip chart as shown and is adapted to be driven in any convenient manner as, for example, by a unidirectional electrical motor 61 through suitable gearing (not shown) so that a record of the temperature to which the thermocouple 4 is subjected will be recorded as a continuous line on the chart 60.

Fundamentally, the circuit through which the unbalanced potentiometer currents flow and in which the lamps 19 and 25 and the transformer primary winding 15 are connected is a polarized switching mechanism, the oscillators 33 and 34 cooperating to periodically and alternately vary the resistance of the filaments of lamps 19 and 25. For purposes of illustration it may be assumed that the resistance of the filament of lamp 19 is increased during the first half cycle of the alternating voltage supplied by the supply conductors L¹ and L², for example, when the upper terminal of the transformer secondary winding 40 is positive with respect to the lower terminal thereof, and that the resistance of the filament of the lamp 25 is increased during the second half cycle when the upper terminal of the winding 40 is negative with respect to the lower terminal thereof.

When the potentiometric measuring circuit 2 is balanced, no current flows in the circuit branch between the potentiometric circuit points 13 and 50. When the temperature to which the thermocouple 4 is subjected increases, the unbalanced direct current in the potentiometric circuit flows in the direction from the potentiometric circuit point 13 through the conductor 5, thermocouple 4, conductor 6, through the opposite halves of the transformer primary winding 15, in circuit with one half of which the lamp 19 is connected and in circuit with the other half of which the lamp 25 is connected, and through the conductor 62 to the potentiometer circuit point 50. Conversely, when the temperature to which the thermocouple 4 is subjected decreases, the unbalanced direct current in the potentiometric circuit flows in the opposite direction through the circuit path just traced, namely, from the potentiometric circuit point 50 to the potentiometric circuit point 13.

When the temperature to which the thermocouple 4 is subjected increases, the resistance of the filament of lamp 19 is increased relatively to the resistance of lamp 25 during the first half cycle of the alternating voltage supplied to the transformer primary winding 39 whereupon the greater part of the unbalanced potentiometer direct current flows from the potentiometer circuit point 13 to conductor 5, thermocouple 4, conductor 6, the lower half of transformer primary winding 15 through conductor 24, lamp 25, transformer secondary winding 26 and conductor 62 to the bridge point 50. Part of the unbalanced potentiometer direct current will flow through the upper half of the transformer primary winding 15 to the lamp 19, the transformer secondary winding 20, the conductor 62 and the bridge point 50, but a predominant part of the current will flow through the lower half of the winding 15 because during this half cycle the resistance of the lamp 25 is considerably less than the resistance of the lamp 19. The excess in the current flow through the lower half of the transformer primary winding 15 over the current flow through the upper half of the transformer primary winding operates to induce a voltage in the transformer secondary winding 17 which is of the proper polarity to cause the upper terminal of the latter winding to become positive with respect to the lower terminal.

During the second half cycle of the alternating voltage supply to the transformer primary winding 39, the resistance of the filament of the lamp 25 will be increased to a value greater than the value of resistance 19, this effect being partially accomplished by resistance of the filament of lamp 19 decreasing from the value assumed during the first half cycle. Accordingly, during the second half cycle of the alternating current supply, the predominant part of the unbalanced potentiometer direct currents will flow from the potentiometer bridge point 13 through the upper half of the transformer primary winding 15 and through the lamp 19 to the potentiometer circuit point 50. Part of the unbalanced potentiometer direct currents will tend to flow through the lower half of the transformer primary winding 15 and through the lamp 25 during the second half cycle but the predominant part of the unbalanced potentiometer direct currents will flow through the upper half of the transformer primary winding 15. The excess of current flow in the upper half of transformer primary winding 15 over that of the lower half of the winding causes the induction of a voltage in the transformer secondary winding of the proper polarity to make the upper terminal of the transformer secondary winding 17 negative with respect to the potential of the lower terminal. Therefore, it will be seen that upon an increase in the temperature to which the thermocouple 4 is subjected, an alternating voltage is produced across the transformer secondary winding 17 which is in phase with the alternating voltage produced across the transformer secondary winding 40 and also is of the same frequency as the alternating voltage produced across the latter winding.

Upon a decrease in the temperature to which the thermocouple 4 is subjected, the unbalanced potentiometric direct currents flow from the circuit point 50 to the point 13. During the first half cycle of the alternating current supplied the transformer primary winding 39, the greater part of the unbalanced direct current will flow from the circuit point 50 through the conductor 62, transformer secondary winding 26, the filament of lamp 25, conductor 24, the lower half of the transformer primary winding 15, conductor 6, thermocouple 4, and conductor 5 to the potentiometric circuit point 13. The greater part of the unbalanced potentiometer direct current flows through this circuit because during this half cycle the resistance of the filament of lamp 19 is greater than the resistance of the filament of the lamp 25. The excess of current flow through the lower half of transformer primary winding 15 over that through the upper half of the latter causes the induction of a voltage in the transformer secondary winding 17 of the proper polarity to cause the upper terminal of the winding 17 to become negative with respect to the potential of the lower terminal.

During the second half cycle of the alternating current supplied the transformer primary winding 39, a predominant part of the unbalanced potentiometer direct current flows from the potentiometer circuit point 50 through conductor 62, transformer secondary winding 20, the filament of lamp 19, conductor 18, the upper half of transformer primary winding 15, conductor 6, thermocouple 4 and conductor 5 to the potentiometer circuit point 13. The greater part of the unbalanced potentiometer direct current flows through this circuit because during this half cycle the resistance of the filament of lamp 19 is less than the resistance of the filament of lamp 25. The excess in the flow of current through the upper half of the transformer primary winding 15 over that through the lower half of the latter operates to induce a voltage in the transformer secondary winding 17 of the proper polarity to cause the potential of the upper terminal to become positive with respect to the potential of the lower terminal. Accordingly, when the temperature to which the thermocouple 4 is subjected decreases, an alternating voltage of the opposite phase is induced in the transformer secondary winding 17.

Summarizing, when the potentiometric measuring circuit 2 is balanced, there is no current flow through the transformer primary winding 15, and therefore, no voltage is induced in the transformer secondary winding 17. Upon an increase in the temperature to which the thermocouple 4 is subjected, the pulsations in the flow of potentiometric unbalanced current produced through the transformer primary winding 15 by the variations in resistance of the lamps 19 and 25 operates to cause the induction of an alternating voltage in the transformer secondary winding 17 which is in phase with the alternating voltage supplied to the transformer primary winding 39. Conversely, upon a decrease in the temperature to which the thermocouple 4 is subjected the pulsations in the potentiometer unbalanced direct current through the transformer primary winding 15 causes the induction of an alternating voltage in the transformer secondary winding 17 which is approximately 180° out of phase with the alternating voltage supplied to the transformer primary winding 39.

In the preferred embodiment of the present invention the alternating voltage derived in the transformer secondary winding 17 is amplified by the electronic device 1 and the amplified quantity is utilized for the purpose of energizing the phase winding 58 of motor 12 for controlling the selective actuation of the latter for rotation in one direction or the other. The electronic device 1 includes an electronic tube 63 to the input circuit of which the alternating voltage induced in the transformer secondary winding 17 is applied. The electronic tube 63 includes two heater type triodes, which have been designated by the reference numerals 64 and 65, within the same envelope. The triode 64 includes anode, control electrode, cathode, and filament elements, and the triode 65 also includes like elements. The filaments of the triodes 64 and 65 are connected in parallel and receive energizing current from the low voltage secondary winding 66 of a transformer 67 having a line voltage primary winding 68 and high voltage secondary windings 69 and 70. The conductors to the heater filaments of the electronic tube 63 have not been shown in order not to confuse the drawing. The primary winding 68 of the transformer 67 is connected to and receives energizing current from the alternating current supply conductors $L^1$ and $L^2$ which also supply energizing current to the primary winding 39 of the transformer 38. The transformer secondary winding 66 is also connected by means of conductors (not shown) to the heater filaments of electronic tubes 71 and 72. The heater filaments of the electronic tubes 71 and 72 may all be connected in parallel with the heater filaments of the electronic tube 63.

The electronic tube 71 includes two heater type triodes, designated by the reference characters 73 and 74 within the same envelope. Both of the triodes include anode, control electrode, cathode, and heater filaments. The electronic tube 72 also includes two heater type triodes, which have been designated by the reference numerals 75 and 76, within the same envelope. The triodes 75 and 76 each include anode, control electrode, cathode, and heater filament elements.

The triode 74 of the electronic valve 71 is utilized as a half wave rectifier to provide a source of direct current voltage for energizing the anode or output circuits of the triodes 64, 65 and 73. As shown, the control electrode and cathode of the triode 74 are directly connected to each other and the output circuit thereof is energized by the transformer secondary winding 69 through a circuit which may be traced from the left end terminal of the winding 69, as seen in the drawing, through a conductor 77 to the anode of triode 74, the cathode thereof, and through a conductor 78 to the positive terminal of a filter generally designated by the reference numeral 79. The negative terminal of the filter is connected by a conductor 80 to the right end terminal of the winding 69.

The filter 79 includes a condenser 81 which operates to smooth out the ripple in the output voltage of the filter between the points 82 and 83. The filter 79 also includes a resistance 84 and a condenser 85 which operate to smooth out the output voltage of the filter between the points 86 and 83. The filter 79 includes a further resistance 87 and a condenser 88 for smoothing out the output voltage of the filter between the points 89 and 83. The filter, therefore, comprises three stages. Such a three-stage filter is provided because for the most satisfactory and efficient operation it is desirable that the anode voltage supplied to the triode 64 be substantially free from ripple whereas it is not necessary to supply anode voltage so completely free from ripple to the output circuit of the triode 65. Likewise it is not necessary to supply anode voltage as free from ripple to the triode 73 as it is to the triode 63.

The anode circuit of the triode 65 may be traced from the filter point 89, which comprises the positive terminal of the direct current voltage supply, through a fixed resistance 90 to the anode of triode 64, to the cathode thereof, and through a cathode biasing resistance 91 which is shunted by a condenser 92 to the negative filter point 83 through a conductor 93. The cathode biasing resistance 91 and the parallel connected condenser 92 are provided for biasing the control electrode of triode 64 negatively with respect to the cathode.

The input circuit of the triode 64 may be traced from the cathode through the parallel connected resistance 91 and condenser 92 through the transformer secondary winding 17 and a conductor 94 to the control electrode of the triode 64.

The output circuit of the triode 64 is resistance capacity coupled to the input circuit of the triode 65 by means of a condenser 95 and a fixed resistance 96. Particularly, the anode of the triode 64 is connected by condenser 95 to the control electrode of the triode 65 and the control electrode of the triode 65 is connected through the resistance 96 to the conductor 93 and thereby to the cathode of the triode 65.

The anode circuit of the triode 65 may be traced from the positive terminal 86 of the filter 79 through a fixed resistance 97 to the anode of the triode 65, the cathode thereof, and conductor 93 to the negative terminal 83 of the filter.

The output circuit of the triode 65 is resistance capacity coupled to the input circuit of the triode 71 by means of a condenser 98 which is connected between the anode of the triode 65 and the control electrode of the triode 73, and by means of a resistance 99 which is connected between the control electrode of the triode 73 and the cathode thereof. It is noted the resistances 96 and 99 which are connected in the input circuits of the triodes 65 and 73, respectively, operate to maintain the control electrodes of the triodes 65 and 73 at the same potential as their associated cathodes when no voltage is induced in the transformer secondary winding 17, and upon the induction of an alternating voltage in the winding 17, resistances 96 and 99 permit the flow of grid current between the control electrodes of the triodes 65 and 73 and their associated cathodes and thereby limit the extent to which the control electrodes of the triodes may go positive with respect to their associated cathodes.

The anode circuit of the triode 73 may be traced from the positive point 82 of the filter 79 through a fixed resistance 100 to the anode of the triode, to the cathode thereof, and conductor 93 to the negative terminal 83 of the filter.

The output circuit of the triode 73 is resistance capacity coupled by means of a condenser 101 and a resistance 102 to the input circuits of the triodes 75 and 76. As illustrated, a contact 103 in adjustable engagement with the resistance 102 is provided for varying the point of connection of the control electrodes of the valves 75 and 76 to the resistance 102. The resistance 102 and contact 103 perform a dual function, namely, to limit the extent to which the control electrodes of the triodes 75 and 76 may be driven positive with respect to their associated cathodes, and also to vary the proportion of the signal impressed upon the control electrodes 75 and 76 from the output circuit of the triode 73. It will be noted that the signal voltage from the output circuit of the triode 73 is impressed simultaneously and equally on the control electrodes of the triodes 75 and 76.

Anode voltage is supplied the output circuits of the triodes 75 and 76 from the high voltage secondary winding 70 of the transformer 67. The anode of the triode 75 is connected to the left end terminal of the transformer secondary winding 70 and the anode of the triode 76 is connected to the right end terminal of the transformer secondary winding 70. The cathodes of the triodes 75 and 76 are connected together and through a fixed resistance 104 and a conductor 105 to the terminal 53 of the motor 12. The terminal 52 of the motor 12 is connected by a conductor 106 to a center tap on the transformer secondary winding 70. Thus, the triodes 75 and 76 are utilized for supplying energizing current to the phase winding 58 of motor 12.

The electrical circuit shown in the drawing and described herein, for selectively controlling the operation of the reversible electrical motor 12 for rotation in one direction or the other is disclosed and is being claimed in application Serial No. 421,173, filed by W. P. Wills for Measuring apparatus on December 1, 1941. Therefore, for the present purposes it is believed sufficient to note that the motor 12 is preferably so constructed that the impedance of the winding 58 is of the proper value to match the impedance of the anode circuits of the triodes 75 and 76 when the motor is operating in order to obtain the most efficient operation. Preferably, the motor is so constructed that it has a high ratio of inductance to resistance, for example, of the order of 6–1 or from 8–1 at the frequency of the energizing current supplied to it. This provides for maximum power during the running condition of the motor with the least amount of heating, and also provides a low impedance path for braking purposes.

As noted hereinbefore energizing current is supplied to the motor winding 57 from the alternating current supply conductors L¹ and L² through the condenser 56. The condenser 56 is so selected with respect to the inductance of the motor winding 57 as to provide a series resonant circuit having a unity power factor. By virtue of the series resonant circuit the total impedance of the motor winding 57 is substantially equal to the resistance of the winding, and since this resistance is relatively low, a large current flow through the winding 57 is made possible. This permits the attainment of maximum power and torque from the motor 12. In addition, the current flow through the motor winding 57 is in phase with the voltage of the alternating current supply conductors L¹ and L² because of the series resonant circuit. The voltage across the motor winding 57, however, leads the current by substantially 90° because of the inductance of the winding 57.

Energizing current is supplied the motor winding 58 from the transformer secondary winding 70 through the anode circuits of the triodes 75 and 76 through the circuits previously traced. A condenser 107 is connected in parallel with the motor winding 58 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 75 and 76 and accordingly provides efficient operation. The relatively low or internal circuit impedance approximates the actual resistance of the winding 58, and since this resistance is relatively low, the impedance of the local circuit is also relatively low.

During the first half cycle of the alternating voltage produced across the terminals of the transformer secondary winding 70, the anode of the triode 75 is rendered positive with respect to the center tap on the winding 70, and during the second half cycle, the anode of the triode 76 is rendered positive with respect to that center tap. Accordingly, the triodes 75 and 76 are arranged to conduct on alternate half cycles of the alternating current supplied by the supply lines L¹ and L².

For the condition when the potentiometric measuring circuit 2 is balanced, no voltage is induced in the transformer secondary winding 17, and therefore, the potentials of the control electrodes of the triodes 64 and 65 and 73 remain substantially constant, and consequently, no signal is impressed upon the control electrodes of the triodes 75 and 76. Under this condition of operation, a pulse of unidirectional current flows from the anode of the triode 75 to the cathode thereof and through the motor winding 58 during the first half cycle of the alternating voltage supply. During the second half cycle a pulse of current flows from the anode of the triode 76 to the cathode and thence through the motor winding 58. Since the control electrodes of the triodes 75 and 76 are connected together, and since the potentials of these control electrodes remain substantially constant when the potentiometric measuring circuit 2 is balanced, pulses of equal magnitude flow in the anode circuits of the triodes 75 and 76 during each succeeding half cycle of the alternating voltage supplied by the transformer secondary winding 70.

From the foregoing it will be noted that when the potentiometric measuring circuit 2 is balanced, pulsating unidirectional current of twice the frequency of the alternating voltage supplied by conductors L¹ and L² is impressed on the motor winding 58. When thus energized the motor 12 is not urged to rotation in either direction and remains stationary. Due to the relatively high direct current component of the current then flowing through the motor winding 58, the core structure of the motor 12 tends to become saturated whereby the inductive reactance of the motor winding 58 is relatively small. The condenser 107 in shunt to the motor winding 58 is so chosen that the condenser and motor winding then forms a parallel resonant circuit. This saturation of the core structure of the motor 12 operates to exert an appreciable damping effect on the rotor 51, or in other words, an effect tending to prevent rotation of the rotor 51. Consequently, if the rotor 51 has been rotating, saturation of the motor core structure operates to quickly stop the rotation.

Upon unbalance of the potentiometric measuring circuit 2, the magnitude of the pulses of current flowing in the anode circuit of one triode 75 or 76 will be increased while the magnitude of the pulses of current flowing in the anode circuit of the other triode will be decreased. Accordingly, the pulses of unidirectional current supplied to the motor winding 58 during the first half cycle will predominate over those supplied the motor winding 58 during the second half cycle. Such energization of the motor winding 58 operates to introduce therein an alternating component of current of the same frequency as that supplied by the alternating current supply lines L¹ and L². This alternating component of current will be either in phase with or 180° out of phase with the alternating current flowing through the motor winding 57 depending upon the direction of potentiometric unbalance and produces an alternating magnetic field in the motor core structure which reacts with the alternating magnetic field established by the motor winding 57 to produce a rotating field in the motor. This rotating field rotates in one direction or the other depending upon the direction of potentiometric unbalance and effects actuation of the motor rotor 51 for rotation in a corresponding direction. In addition, when the motor winding 58 is so energized, the direct current component of the current flowing therein is decreased and consequently the saturation of the motor core structure is decreased with the result that the rotor damping effect is reduced.

In order to permit rapid operation of the reversible electrical motor 12 in effecting rebalance of the potentiometric network 2 without overshooting and consequent hunting occurring, the response of the motor 12 must be correlated with the unbalancing and rebalancing operations of the potentiometric network. This may be accomplished by adjusting the contact 103 along the resistance 102 which is employed for the purpose of coupling the output circuit of triode 103 to the input circuits of the triodes 75 and 76. The contact 103 and resistance 102 may be termed a sensitivity adjustment. By moving the contact 103 in an upward direction the amplitude of swing of the control electrodes of the triodes 75 and 76 is increased for any given signal impressed on the input circuit of the electronic amplifier 1 and by moving the contact 103 in a downward direction the amplitude of swing is decreased. This accordingly adjusts the sensitivity of the electronic amplifier 1 whereby the response of the reversible electrical motor 12 may be exactly correlated with the operation of the potentiometric network.

As will be understood by those skilled in the art one or the other of the lamps 19 and 25 and its associated equipment for impressing a modulated high frequency electric current therein may be dispensed with if desired and the other lamp and its associated equipment may be utilized alone for the purpose of effecting a pulsating current flow through the primary winding of transformer 16 in converting the unbalanced potentiometric direct currents into an alternating current which may be readily amplified and utilized for the purpose of controlling the selective actuation of the reversible electrical motor 12. When one lamp 19 or 25 is dispensed with the primary winding 15 of the transformer 16 need not be center tapped. Such a modification is illustrated in Fig. 2 of the drawing wherein the primary winding of the transformer 16 has been designated by the reference character 15'.

The use of the arrangement disclosed in Fig. 1 and utilizing two lamps 19 and 25 for the purpose of converting the unbalanced potentiometric direct currents into an alternating current of one phase or of opposite phase depending upon the direction of potentiometric unbalance is to be desired over the simplified arrangement shown in Fig. 2 because with the arrangement of Fig. 1 any stray alternating current of the same frequency as that supplied by the conductors $L^1$ and $L^2$ which is induced in the thermocouple leads or in the potentiometric circuit is converted by the arrangement including lamps 19 and 25 into an alternating current of twice the frequency of the alternating current supplied by the supply lines $L^1$ and $L^2$. For example, when the alternating current supplied by the lines $L^1$ and $L^2$ is 60 cycle current, any stray alternating currents which may be induced in the thermocouple or potentiometric circuit is converted into 120 cycle alternating current. This 120 cycle alternating current has no effect upon the operation of the reversible electrical motor 12 because of the particular construction of the electronic amplifier 1 and the connection of the reversible electrical motor 12 to the output circuit of the amplifier. The reason why 120 cycle alternating current does not affect the operation of the electronic amplifier 1 and the reversible electrical motor 12 is pointed out in detail in the Wills application, Serial No. 421,173 referred to hereinbefore and therefore need not be explained in detail herein.

It will be apparent that the reversible electrical motor 12 may be employed to operate a valve 108 positioned in a fuel supply pipe 109 for varying the supply of heating agent to the furnace 3, to the temperature of which the thermocouple 4 is responsive, or preferably a separate reversible electrical motor may be so employed. For example, as disclosed in the drawing, a reversible electrical motor 110 having two opposed field windings (not shown) may be utilized for this purpose. The reversible motor 110 is mechanically connected in any suitable manner to the valve 108 and is adapted to adjust the latter to its opened and closed positions depending upon the direction to which the motor 110 is energized for rotation. The mechanical connection of the motor 110 to the valve 108 is such as to increase and to decrease the supply of heating agent to the furnace 3 as the temperature of the latter falls below or rises above a predetermined level.

The motor 110 is energized for rotation in one direction or the other depending upon which of the two opposed field windings is energized by means of a switch 111. The switch 111 includes a contact 112 which is carried by the carriage 9 and is disposed in operative relation with a pair of elongated contact segments 113 and 114. The contact segments 113 and 114 are insulated from each other and from the contact 112 and are disposed end to end along the slidewire resistance 7 of the potentiometric measuring circuit. The adjacent ends of the contact segments 113 and 114 are separated by a suitable distance and are so related to the slidewire resistance 7 that, when the contact 112 is intermediate the segments 113 and 114 and out of engagement with both, the temperature within the furnace 3 will be at the desired control point. The switch contact 112 is insulated from the slidewire resistance 7 and also from the carriage 9.

The switch contact 112 is connected to the alternating current supply conductor $L^1$ and the common terminal of the opposed windings of motor 110 is connected to the supply conductor $L^2$. The contact segment 113 is connected by a conductor 115 to the other terminal of one of the opposed motor field windings, and the contact segment 114 is connected by conductor 116 to the other terminal of the other motor field winding. Thus, upon engagement of the contact 112 with the contact segment 113, one of the windings of motor 110 is energized and actuates the motor for rotation in one direction, and upon engagement of the contact 112 with the contact segment 114, the other of the windings of motor 110 is energized and actuates the motor for rotation in the opposite direction.

Although not shown the contact segments 113 and 114 of the switch 111 are desirably made adjustable so that both the control point setting and sensitivity of the apparatus may be set in a manner well known in the art.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention what 1 claim as new and desire to secure by Letters Patent is:

1. In measuring apparatus, the combination of an adjustable potentiometer device, means to produce unbalanced currents in said potentiometer device, means for converting the unbalanced potentiometer currents into varying current of predetermined frequency, said last mentioned means including an electrical resistive device having an appreciable temperature coefficient of resistance through which the unbalanced portion of the potentiometer current is passed, a source of high frequency electric current modulated at said predetermined frequency, and means for impressing said high frequency current on said resistive device independently of said potentiometer to vary the temperature of said resistive device at said predetermined frequency, means for amplifying said converted currents, a reversible rotatable motor for adjusting said potentiometer device to reduce said unbalanced potentiometer currents, and motor control means controlled by said amplified currents to control the rotation of said reversible motor.

2. In measuring apparatus, the combination of an adjustable potentiometer device, means to produce unbalanced currents in said potentiometer device, means for converting the unbalanced potentiometer current into varying current of predetermined frequency, said last mentioned means including an electrical resistive device having an appreciable temperature coefficient of resistance through which the unbalanced portion of the potentiometer current is passed, a source of high frequency electric current modulated at said predetermined frequency, and means for impressing said high frequency current on said resistive device independently of said potentiometer to vary the temperature of said resistive device at said predetermined frequency, means for amplifying said converted currents, and means actuated by said amplified currents for adjusting said device to reduce said unbalanced potentiometer currents.

3. The combination with a circuit including a resistive device having an appreciable temperature coefficient of resistance, of means for impressing a small unidirectional electromotive force on said circuit, an oscillator for producing a high frequency electrical current modulated at a predetermined frequency, means for impressing said high frequency current on said device to vary the temperature of said device at said predetermined frequency and thereby to vary the resistance of said device at said predetermined frequency, alternating current supply means for energizing said oscillator, and inductive control means jointly energized by currents directly supplied by said supply means and by current flow in said circuit.

4. The combination with a parallel circuit each branch of which includes a resistive device having an appreciable temperature coefficient of resistance and one half of a center tapped primary winding of a transformer also having a secondary winding of means for impressing a small unidirectional electromotive force on said parallel circuit, an oscillator for producing a high frequency electrical current modulated at a predetermined frequency, a second oscillator for producing a second high frequency electrical current modulated at said predetermined frequency but the envelope of which is displaced approximately 180° relatively to the envelope of said first mentioned high frequency current, and means for impressing said first mentioned high frequency current on one branch of said parallel circuit to vary the temperature and thereby the resistance of the device connected therein at said predetermined frequency and for impressing said second mentioned high frequency current on the other branch of said parallel circuit to vary the temperature and thereby the resistance of the device connected therein at said predetermined frequency whereby said unidirectional electromotive force alternately creates a pulsating current flow first in one branch and then the other branch of said parallel circuit to cause the induction of an alternating electromotive force in the secondary winding of said transformer of one phase or of opposite phase depending upon the polarity of said unidirectional electromotive force.

5. The combination with a parallel circuit each branch of which includes a resistive device having an appreciable temperature coefficient of resistance and one half of a center tapped primary winding of a transformer also having a secondary winding of means for impressing a small unidirectional electromotive force on said parallel circuit, an oscillator for producing a high frequency electrical current modulated at a predetermined frequency, a second oscillator for producing a second high frequency electrical current modulated at said predetermined frequency but the envelope of which is displaced approximately 180° relatively to the envelope of said first mentioned high frequency current, means for impressing said first mentioned high frequency current on one branch of said parallel circuit to vary the temperature and thereby the resistance of the device connected therein at said predetermined frequency and for impressing said second mentioned high frequency current on the other branch of said parallel circuit to vary the temperature and thereby the resistance of the device connected therein at said predetermined frequency whereby said unidirectional electromotive force alternately creates a pulsating current flow first in one branch and then the other branch of said parallel circuit to cause the induction of an alternating electromotive force in the secondary winding of said transformer of one phase or of opposite phase depending upon the polarity of said unidirectional electromotive force, alternating current supply means for energizing both of said oscillators, and inductive control means jointly energized by currents directly supplied by said supply means and by alternating current derived from the secondary winding of said transformer.

6. The combination with a small unidirectional source of electromotive force, a resistive device having an appreciable temperature coefficient of resistance, and a transformer having its primary winding connected in circuit with said device and said source, of means continuously passing modulated high frequency current through said device to regularly vary the temperature of said device and thereby to regularly vary the resistance of said device.

7. The combination with a small unidirectional source of electromotive force, a resistive device having an appreciable temperature coefficient of resistance, and a transformer having its primary winding connected in circuit with said device and said source, of means continuously passing modulated high frequency current through said device to regularly vary the temperature of said device and thereby to regularly vary the resistance of said device, and amplifying means connected to the secondary winding of the transformer.

8. The combination with a circuit including a resistive device having an appreciable temperature coefficient of resistance, of means for impressing a small unidirectional electromotive force on said circuit, means for continuously passing modulated high frequency current through said resistance to regularly vary the temperature of said device and thereby to regularly vary the resistance of said device whereby said force creates a pulsating current flow in said circuit, and amplifying means energized by said pulsating current flow.

9. In measuring apparatus, a source of direct current whose magnitude is to be measured, an electrical resistive device having an appreciable temperature coefficient of resistance through which said direct current is passed, a source of modulated high frequency current arranged to energize said device independently of said direct current source, means for amplifying said first mentioned current after its passage through said device, and means actuated by said amplified current for indicating the magnitude of said direct current.

10. The combination with a circuit including an electrical resistive device having an appreciable temperature coefficient of resistance, of means for impressing a small unidirectional electromotive force on said circuit, a modulated high frequency current source, and means for impressing modulated high frequency curent from said source on said device to vary the temperature of said device at the frequency of the modulations of said source.

11. The combination of a thermocouple, an electrical resistive device having an appreciable temperature coefficient of resistance and a transformer having its primary winding connected in circuit for the flow of current from said thermocouple through said resistive device and primary winding, a modulated high frequency current supply source, and means for impressing high frequency current from said source on said resistive device independently of said thermocouple to vary the resistance of said resistive device at the frequency of the modulations of said source.

12. The combination of a thermocouple, an electrical resistive device having an appreciable temperature coefficient of resistance and a transformer having a primary winding connected in circuit for the flow of current from said thermocouple through said resistive device and primary winding, a modulated alternating current supply source, and means for impressing alternating current from said source on said resistive device to vary the resistance of said resistive device at the frequency of the modulations of said source.

13. The combination with a circuit including an electrical resistive device having an appreciable temperature coefficient of resistance, of means for impressing a small unidirectional electromotive force on said circuit, a modulated alternating current source, and means for impressing modulated alternating current from said source on said device to vary the temperature of said device at the frequency of the modulations of said source.

HARRY S. JONES.